UNITED STATES PATENT OFFICE.

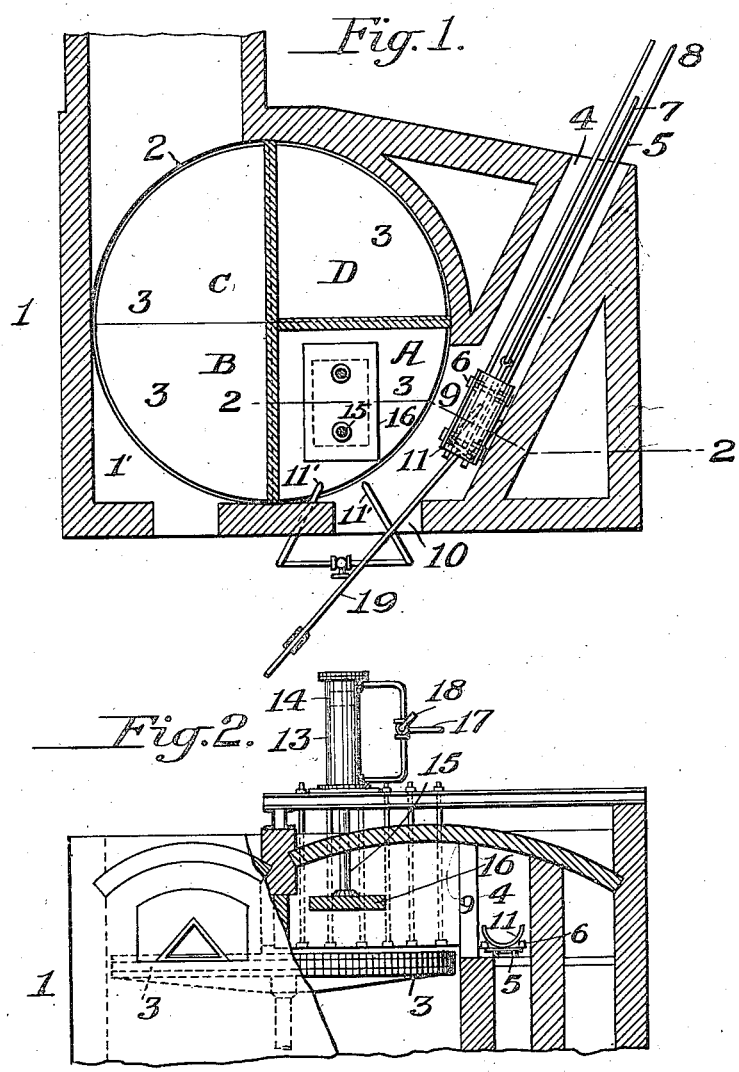

JOSEPH STILE, OF JEANNETTE, PENNSYLVANIA.

APPARATUS AND PROCESS FOR FLATTENING AND FORMING GLASS.

1,259,459. Specification of Letters Patent. Patented Mar. 12, 1918.

Application filed November 8, 1917. Serial No. 200,928.

*To all whom it may concern:*

Be it known that I, JOSEPH STILE, a subject of the King of Italy, residing at Jeannette, in the county of Westmoreland, State of Pennsylvania, have invented a new and useful Improvement in Apparatus and Process for Flattening and Forming Glass, of which the following is a specification.

My invention relates to the manufacture of glass sheets and forms and particularly to method of flattening and forming said glass without the laborious process of using a block.

The object of my invention is to provide a cheap, simple and efficient method of flattening and forming glass by mechanical means, whereby a perfect article is produced with a reduced cost of labor and incidental toil.

My invention consists, generally stated, in the novel arrangement, construction, and combination of parts as hereinafter more specifically set forth and described and particularly pointed out in the appended claims.

To enable others skilled in the art to which my invention appertains to construct, use and operate the apparatus for carrying out my invention I will describe the same referring to the accompanying drawing in which:

Figure 1 is a horizontal sectional view of an oven for carrying out my invention.

Fig. 2 is a front view of the same taken partly in vertical section on the line 2—2 of Fig. 1.

Like symbols of reference indicate like parts in each of the figures of the drawing.

As illustrated in the drawing the oven 1 has a circular compartment 1' for housing the circular table 2 and this table 2 is provided with a series of stone or composition blocks 3. While I have shown but four blocks, A, B, C, and D, any number may be employed. Beneath the table 2 is suitable mechanism (not shown) for rotating the same in order to bring the successive blocks into use, as later explained. At one side of the oven 1 is a passageway 4 which is provided with a pair of rails or tracks 5 upon which a carriage or pan 6 is operated. This carriage 6 is provided with a long rod or handle 7, and is operated by a shove boy who stands at the position 8. The passageway 4 communicates with the circular compartment 1' through the opening 9, while the front of the oven is provided with an opening 10 for handling the shawl 11 as later explained. Immediately in front of the block designated as A are two gas or other fuel burners 11' which heat the shawl 11 to the required temperature.

At a position immediately above the block A, and securely mounted on the I-beams 12 is a cylinder 13 having a piston 14 within the same, and said piston is provided with an extended rod 15 to the end of which is connected the forming member 16.

In practice, for the purpose of forming glass sheets and even for other purposes I prefer to use a stone or composition forming member, which in addition to giving the desired smooth surface will not stick or adhere to the formed glass. The cylinder 13 is supplied with operating fluid, such as compressed air, by means of the supply pipe 17, and is provided with a valve 18 for controlling the direction of travel of the piston 14.

Having described the apparatus for carrying out my invention, I will now explain the operation of the same: The shawl 11 is placed on the carriage 6 on the tacks 5 while in a cold state and the shove boy pushes the carriage until it is in a proper position to permit the operator to use his fork 19 and bring the shawl 11 onto the block A. At this point the heat from the burners 11' is directed against the shawl 11 and when it has been heated to the required temperature the operator grasps the valve 18 which permits the operating fluid to lower the piston 14 and consequently press the stone or forming member 16 onto the shawl 11 to form or flatten the same.

When the shawl 11 enters the oven 1 it is semi-cylindrical but when the heat from the burners 11' is applied, its own weight causes its edges to recline and the forming member finishes the same. As soon as the glass is formed the cylindrical table 2 is rotated 90 degrees and the block B is then employed for supporting the succeeding shawl. If the stone or forming member 16 becomes too hot for producing the best or required results the cylinder 13 and rod 14 may be lengthened and elevated so that the stone or forming member 16 may be withdrawn from the oven 1' and said stone or forming member 16 may be air cooled by a fan (not shown) or may be sprayed.

The flattening stone should be, as shown, larger than the sheet of glass to be flattened, so that the shawls, in the slightly varying positions in which they will be placed by the operator, will always be completely covered by the flattening stone.

Various modifications and changes in the design, construction and operation of my improved oven and the process employed, may be resorted to without departing from the spirit of the invention or sacrificing any of its advantages.

What I claim as my invention and desire to secure by Letters Patent is:

1. An apparatus for flattening glass, comprising a support for a sheet of glass to be flattened, means for heating glass upon the support, a flattening member having a plain surface as large as the sheet of glass to be flattened, and means for lowering and raising the flattening member to and from the glass on the support.

2. An apparatus for flattening and forming glass comprising, a revoluble table upon one section of which the shawl rests, a flattening member having a plain surface as large as the sheet of glass to be formed above the active section; means for lowering and pressing said member against said shawl, and means for directing heat upon said shawl during the flattening of the same.

3. The herein described method of flattening and forming glass, comprising the steps of placing the shawl upon a table, then directing heat against the same, and then lowering a flattening member having a plain surface as large as the sheet of glass to be formed by mechanical means to exert pressure thereon.

In witness whereof, I, the said JOSEPH STILE have hereunto set my hand this 13th day of October 1917.

JOSEPH STILE.

Signed in the presence of—
M. HOMER MILLER,
JOS. DE PALMA.